US010396620B2

United States Patent
Egami et al.

(10) Patent No.: US 10,396,620 B2
(45) Date of Patent: Aug. 27, 2019

(54) ROTATING ELECTRICAL MACHINE CONNECTION COMPONENT AND METHOD OF MANUFACTURING THE SAME

(71) Applicants: Hitachi Metals, Ltd., Tokyo (JP); Honda Motor Co., Ltd., Tokyo (JP)

(72) Inventors: Kenichi Egami, Kitaibaraki (JP); Takuya Yoshizawa, Wako (JP); Mitsuhiro Okamura, Wako (JP)

(73) Assignees: Hitachi Metals, Ltd., Tokyo (JP); Honda Motor Co., Ltd., Tokyo (JP)

( * ) Notice: Subject to any disclaimer, the term of this patent is extended or adjusted under 35 U.S.C. 154(b) by 375 days.

(21) Appl. No.: 15/297,433

(22) Filed: Oct. 19, 2016

(65) Prior Publication Data
US 2017/0110929 A1   Apr. 20, 2017

(30) Foreign Application Priority Data

Oct. 20, 2015 (JP) .................................. 2015-206093

(51) Int. Cl.
| | | |
|---|---|---|
| H02K 11/00 | (2016.01) | |
| H02K 5/22 | (2006.01) | |
| H02K 15/00 | (2006.01) | |
| H02K 3/50 | (2006.01) | |

(52) U.S. Cl.
CPC ............ H02K 5/225 (2013.01); H02K 3/50 (2013.01); H02K 15/0062 (2013.01); H02K 15/0068 (2013.01)

(58) Field of Classification Search
CPC ................................................... H02K 5/225
USPC ........................................................ 310/71
See application file for complete search history.

(56) References Cited

U.S. PATENT DOCUMENTS

| | | | |
|---|---|---|---|
| 6,894,410 B2 * | 5/2005 | Kobayashi | ......... H02K 15/0056 |
| | | | 310/239 |
| 7,034,419 B2 | 4/2006 | Kabasawa et al. | |
| 7,164,217 B2 | 1/2007 | Kabasawa et al. | |
| (Continued) | | | |

FOREIGN PATENT DOCUMENTS

| | | |
|---|---|---|
| JP | 2004096841 A | 3/2004 |
| JP | 2011-259654 A | 12/2011 |
| JP | 2015-133873 A | 7/2015 |

OTHER PUBLICATIONS

Office Action issued in the corresponding Japanese Application No. 2015-206093 dated Jun. 4, 2019.

*Primary Examiner* — Alexander Talpalatski
(74) *Attorney, Agent, or Firm* — Roberts Mlotkowski Safran Cole & Calderon, P.C.

(57) ABSTRACT

A rotating electrical machine connection component includes a plurality of linear conductors, and a first molded resin portion that covers portions of the plurality of linear conductors and connects the plurality of linear conductors to each other. Each of the plurality of linear conductors includes a first straight portion extending out of the first molded resin portion in a direction parallel to a rotational axis of the rotor and connected to the terminal block, a second straight portion extending out of the first molded resin portion in a different direction from the first straight portion and a bent portion bent between the first and second straight portions. Of each of the plurality of linear conductors, a part of the first straight portion, the bend portion and a part of the second straight portion are covered by the first molded resin portion.

16 Claims, 9 Drawing Sheets

(56) References Cited

U.S. PATENT DOCUMENTS

| | | | | |
|---|---|---|---|---|
| 7,262,529 B2* | 8/2007 | Klappenbach | ......... | H02K 3/522 |
| | | | | 310/71 |
| 7,579,732 B2* | 8/2009 | Yamaguchi | .............. | H02K 3/50 |
| | | | | 310/43 |
| 8,046,913 B2* | 11/2011 | Lee | ........................ | H02K 3/522 |
| | | | | 264/326 |
| 9,325,213 B2* | 4/2016 | Egami | .................... | H02K 5/225 |
| 9,419,491 B2* | 8/2016 | Egami | ...................... | H02K 3/50 |
| 10,199,898 B2 | 2/2019 | Haruno et al. | | |
| 2003/0094879 A1* | 5/2003 | Kobayashi | ............. | H02K 3/522 |
| | | | | 310/238 |
| 2004/0070293 A1 | 4/2004 | Kabasawa et al. | | |
| 2006/0138884 A1 | 6/2006 | Kabasawa et al. | | |
| 2011/0316373 A1* | 12/2011 | Kobayashi | ............... | H01R 9/24 |
| | | | | 310/71 |
| 2012/0126646 A1* | 5/2012 | Nakagawa | ............. | H02K 3/522 |
| | | | | 310/71 |
| 2013/0264899 A1* | 10/2013 | Goto | ........................ | H02K 3/50 |
| | | | | 310/71 |
| 2016/0336829 A1 | 11/2016 | Haruno et al. | | |

* cited by examiner

ROTATING ELECTRICAL MACHINE CONNECTION COMPONENT AND METHOD OF MANUFACTURING THE SAME

The present application is based on Japanese patent application No. 2015-206093 filed on Oct. 20, 2015, the entire contents of which are incorporated herein by reference.

BACKGROUND OF THE INVENTION

1. Field of the Invention

The invention relates to a rotating electrical machine connection component used to supply multi-phase currents having different phases to windings of a stator of a rotating electrical machine, and a method of manufacturing the rotating electrical machine connection component.

2. Description of the Related Art

A rotating electrical machine is mounted as a drive source on electric cars and so-called hybrid vehicles. A rotating electrical machine has a rotor with a permanent magnet fixed to a circumferential surface and a stator composed of an annular core surrounding the rotor and windings wound thereon. The rotating electrical machine may be provided with a terminal block which is arranged in the vicinity thereof and through which multi-phase currents are supplied to the windings of the stator via a connection component (see e.g., JP-A-2011-259654).

The rotating electrical machine described in JP-A-2011-259654 is a three-phase motor configured that three-phase currents of U-, V- and W-phases are supplied to windings of the stator. The terminal block is connected to the phase windings by a connection component having three power lines corresponding to the respective phases.

The three power lines are fixed to each other by a bar-shaped fixing member which is curved along a circumferential direction of the stator. Three through-holes extending in a radial direction of the stator are formed in the fixing member, and straight portions of the power lines are respectively inserted into the through-holes.

SUMMARY OF THE INVENTION

If the fixing member of the connection component described in JP-A-2011-259654 is formed of a resin, the outer surface of the power lines frictionally slides on the inner surface of the through-holes due to vibration caused by motion of vehicle or rotation of the rotating electrical machine and the inner diameter of the through-holes may be enlarged due to the resulting wear of the fixing member. Once the inner diameter of the through-holes is enlarged, the fixing member largely vibrates with respect to each power line and may generate noise.

The rotating electrical machine and the terminal block are directly or indirectly attached to a vehicle body. Thus, depending on the attachment structure and the configuration of the vehicle, a distance between the stator and the terminal block may change due to motion of the vehicle or rotation of the rotating electrical machine. If the inner diameter of the through-holes is enlarged due to wear of the fixing member in such a case, the power lines are not appropriately fixed to each other by the fixing member, a distance between the power lines or a distance between the power line and the winding may be reduced due to the relative movement of the power lines with respect to the fixing member, so that the insulation distance may not be secured sufficiently.

It is an object of the invention to provide a rotating electrical machine connection component that prevents the movement of plural linear conductors with respect to a resin member where the linear conductors to connect the terminal block to winding of the stator are coupled to each other by the resin member, as well as a method of manufacturing the rotating electrical machine connection component.

According to an embodiment of the invention, provided is a rotating electrical machine connection component, which is used to supply multi-phase currents having different phases to windings of a rotating electrical machine that comprises a rotor and a stator comprising an annular core surrounding the rotor and having the windings wound thereon, comprising:

a plurality of linear conductors that respectively correspond to the different phases and are provided such that one end is connected to the winding and the other end is connected to a terminal block; and a first molded resin portion that covers portions of the plurality of linear conductors and connects the plurality of linear conductors to each other, wherein each of the plurality of linear conductors comprises a first straight portion extending out of the first molded resin portion in a direction parallel to a rotational axis of the rotor and connected to the terminal block, a second straight portion extending out of the first molded resin portion in a different direction from the first straight portion and a bent portion bent between the first and second straight portions, and of each of the plurality of linear conductors, a part of the first straight portion, the bend portion and a part of the second straight portion are covered by the first molded resin portion.

According to another embodiment of the invention, provided is a method of manufacturing a rotating electrical machine connection component, which is used to supply multi-phase currents having different phases to windings of a rotating electrical machine that comprises a rotor and a stator comprising an annular core surrounding the rotor and the windings wound thereon, the rotating electrical machine connection component comprising a plurality of linear conductors that respectively correspond to the different phases, and a molded resin portion that covers portions of the plurality of linear conductors and connects the plurality of linear conductors to each other, wherein the plurality of linear conductors are provided such that one end is connected to the winding and the other end is connected to a terminal block, each of the plurality of linear conductors comprises a first straight portion extending out of the molded resin portion in a direction parallel to a rotational axis of the rotor and connected to the terminal block, a second straight portion extending out of the molded resin portion in a different direction from the first straight portion and a bent portion bent between the first and second straight portions, and each of the plurality of linear conductors comprises a plurality of wiring materials arranged in parallel, the method comprising molding the molded resin portion, wherein the molding comprises primarily molding a plurality of primary molded resin portions coupling the respective plurality of wiring materials of the plurality of linear conductors, and secondarily molding a secondary molded resin portion coupling the plurality of primary molded resin portions to each other.

Effects of the Invention

According to an embodiment of the invention, a rotating electrical machine connection component can be provided that prevents the movement of plural linear conductors with respect to a resin member where the linear conductors to connect the terminal block to winding of the stator are coupled to each other by the resin member, as well as a method of manufacturing the rotating electrical machine connection component.

BRIEF DESCRIPTION OF THE DRAWINGS

Next, the present invention will be explained in more detail in conjunction with appended drawings, wherein:

FIGS. 8A to 8F show a first molded resin portion when viewed from the outside of the three-phase motor, wherein FIG. 8A is a general view, FIG. 8B is a state diagram before a secondary molding step, FIG. 8C is a cross sectional view taken along a line A-A in FIG. 8B, FIG. 8D is a cross sectional view taken along a line B-B in FIG. 8A, FIG. 8E is a cross sectional view taken along a line C-C in FIG. 8A, and FIG. 8F is a cross sectional view taken along a line D-D in FIG. 8A.

DETAILED DESCRIPTION OF THE PREFERRED EMBODIMENTS

Embodiment

Figure 1:
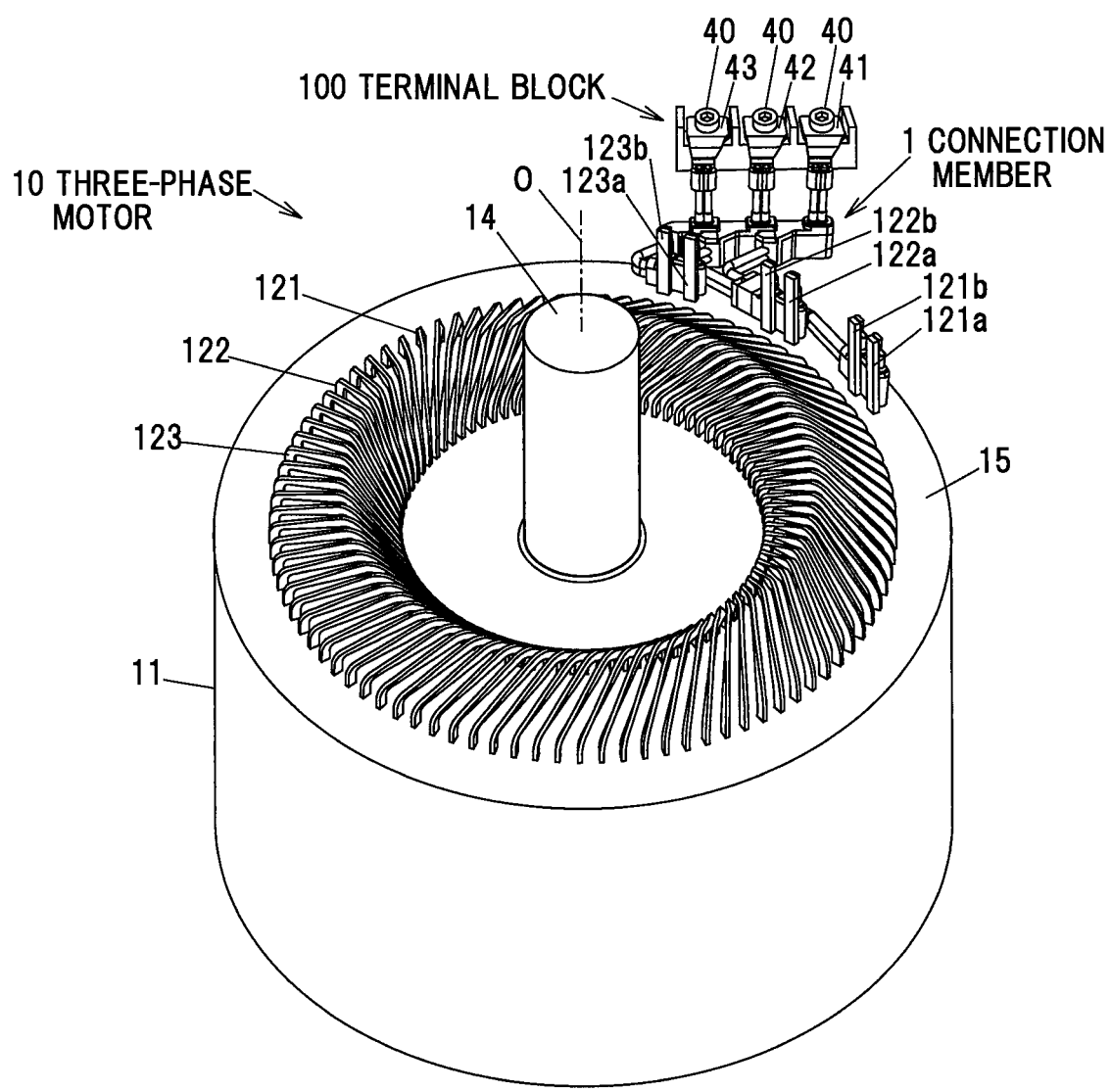
FIG. 1 is a perspective view showing a rotating electrical machine connection component in an embodiment of the present invention and a three-phase motor as a rotating electrical machine which is supplied with an electric current through the rotating electrical machine connection component.
Figure 2A:
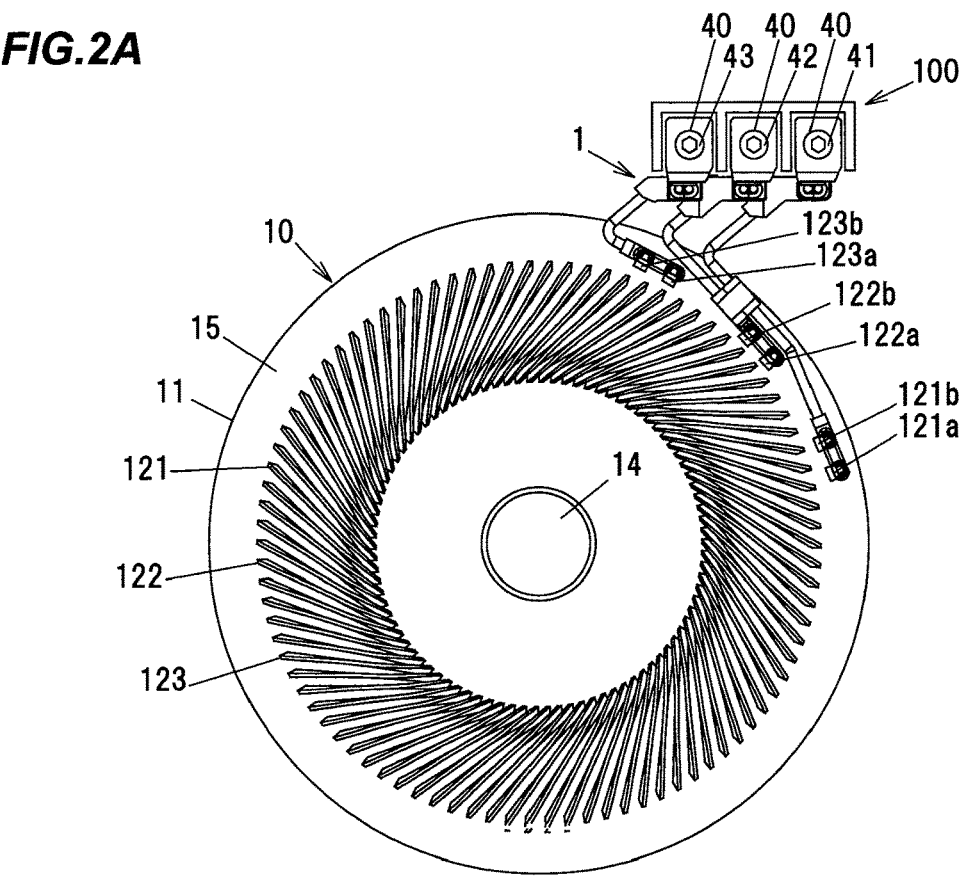
FIG. 2A is a plan view showing the rotating electrical machine connection component and the three-phase motor.
Figure 2B:
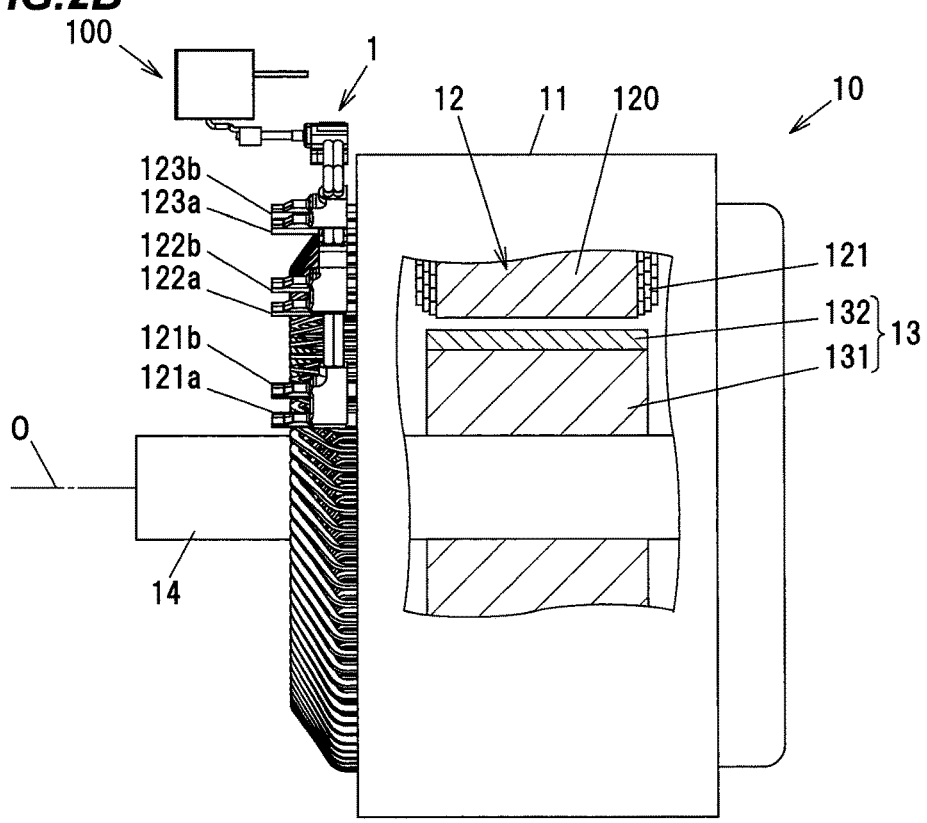
FIG. 2B is a side view showing the rotating electrical machine connection component and the three-phase motor.

FIG. 1 is a perspective view showing a rotating electrical machine connection component 1 in an embodiment of the invention and a three-phase motor 10 as a rotating electrical machine which is supplied with an electric current through the rotating electrical machine connection component 1. FIG. 2A is a plan view showing the rotating electrical machine connection component 1 and the three-phase motor 10 and FIG. 2B is a side view showing the rotating electrical machine connection component 1 and the three-phase motor 10. In FIG. 2B, a portion of the three-phase motor 10 is cutaway to show the internal structure.

The three-phase motor 10 is mounted as a drive source on a vehicle and is supplied with three-phase AC currents from an inverted (not shown) via a terminal block 100 and the rotating electrical machine connection component 1. Hereinafter, the rotating electrical machine connection component 1 is simply referred as "connection component 1".

The three-phase motor 10 has a closed-end cylindrical motor case 11, a stator 12 housed in the motor case 11, a rotor 13 arranged inside the stator 12, a shaft 14 penetrating the center of the rotor 13 and supported so as to be integrally rotatable with the rotor 13, and a lid member 15 formed of a molding resin and covering an opening of the motor case 11.

In the stator 12, U-, V- and W-phase windings 121 to 123 are wound on an annular stator core 120 which surrounds the rotor 13. In more detail, the stator core 120 is provided with plural teeth on each of which one of the U-, V- and W-phase windings 121 to 123 is wound. The stator core 120 is formed of a magnetic material such as steel. Each of the windings 121 to 123 is a rectangular insulated wire in which an insulating cover layer formed of enamel is provided on an outer peripheral surface of a copper conductor. The windings 121 to 123 are molded in the lid member 15 so as to be partially exposed to the outside of the motor case 11 from the lid member 15.

The rotor 13 has a cylindrical rotor core 131 having a through-hole to insert the shaft 14, and a magnet 132 arranged around the rotor core 131. The magnet 132 has plural magnetic poles such that S poles and N poles are located alternately. The shaft 14 is rotatably supported on the motor case 11 by a shaft bearing (not shown).

Figure 3:
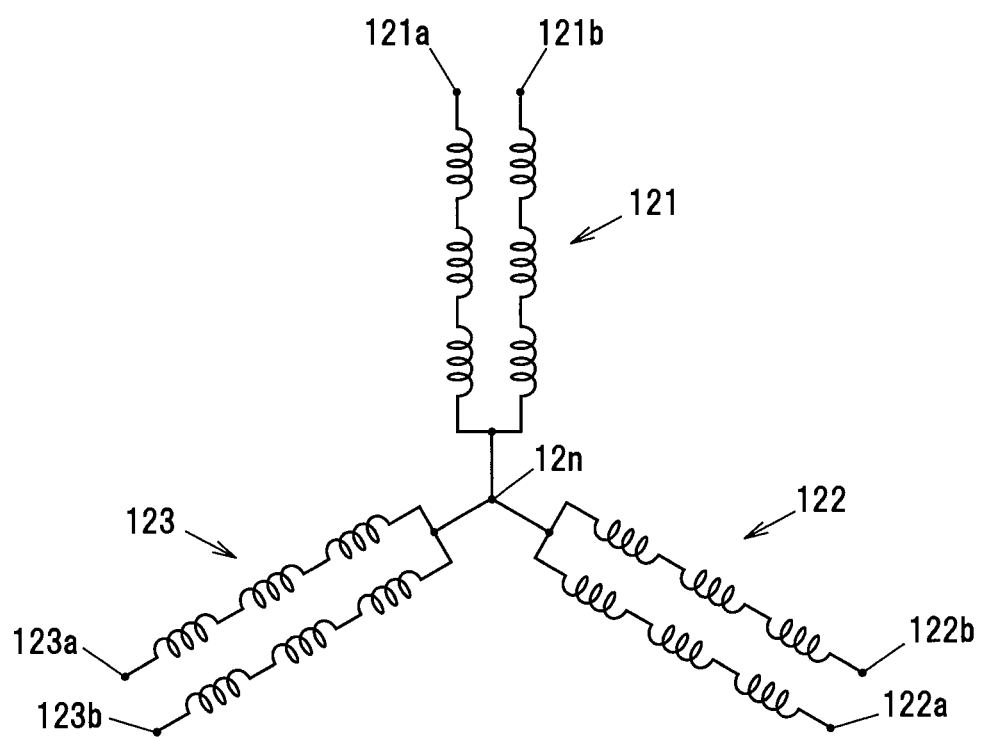
FIG. 3 is a circuit diagram showing a configuration example of an electric circuit formed by windings in the three-phase motor.

FIG. 3 is a circuit diagram illustrating a configuration example of an electric circuit formed by the windings 121 to 123 in the three-phase motor 10. The U-phase winding 121, the V-phase winding 122 and the W-phase winding 123 are wound on the stator core 120 into coils respectively at plural positions (six positions in the example shown in FIG. 3), and the respective center portions are connected to a neutral point 12n. A U-phase current is supplied to one end 121a and another end 121b of the U-phase winding 121. A V-phase current is supplied to one end 122a and another end 122b of the V-phase winding 122. A W-phase current is supplied to one end 123a and another end 123b of the W-phase winding 123. In other words, the connection component 1 is used to supply multi-phase currents having different phases to the windings 121 to 123 of the corresponding phases.

Figure 4A:
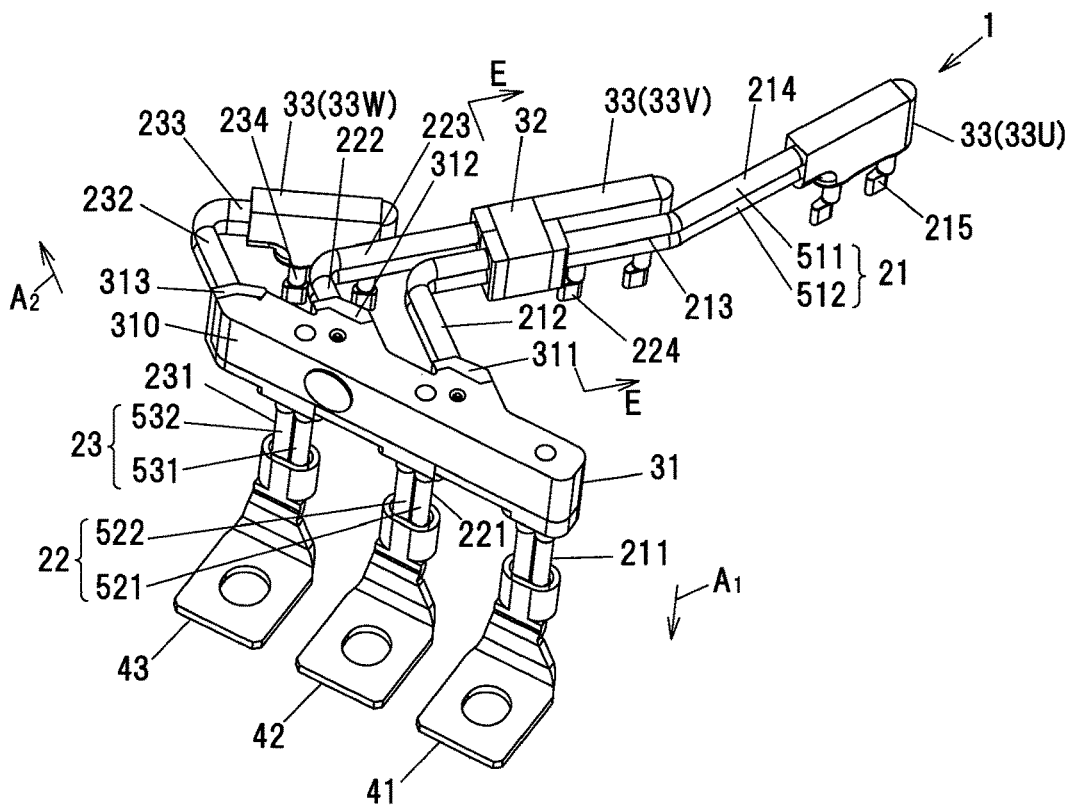
FIG. 4A is a perspective view showing the connection component.
Figure 4B:
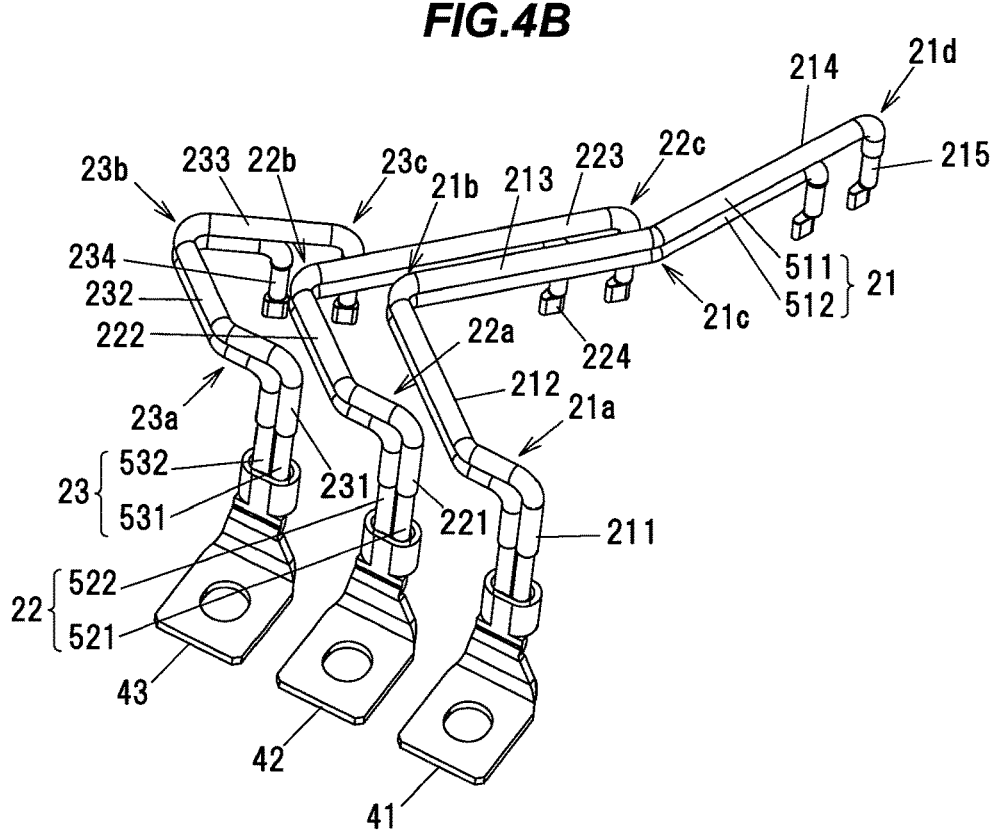
FIG. 4B is a perspective view showing the entirety of first to third linear conductors wherein the illustration of first to third molded resin portions is omitted.
Figure 5A:
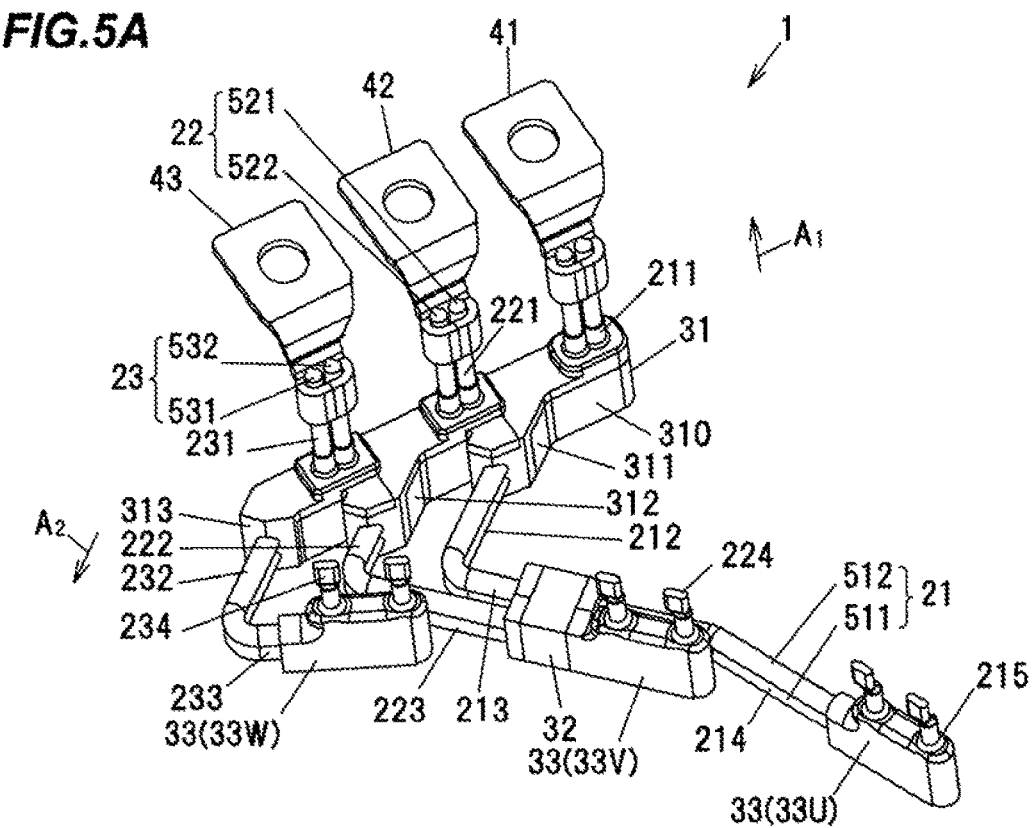
FIG. 5A is a perspective view showing the connection component.
Figure 5B:
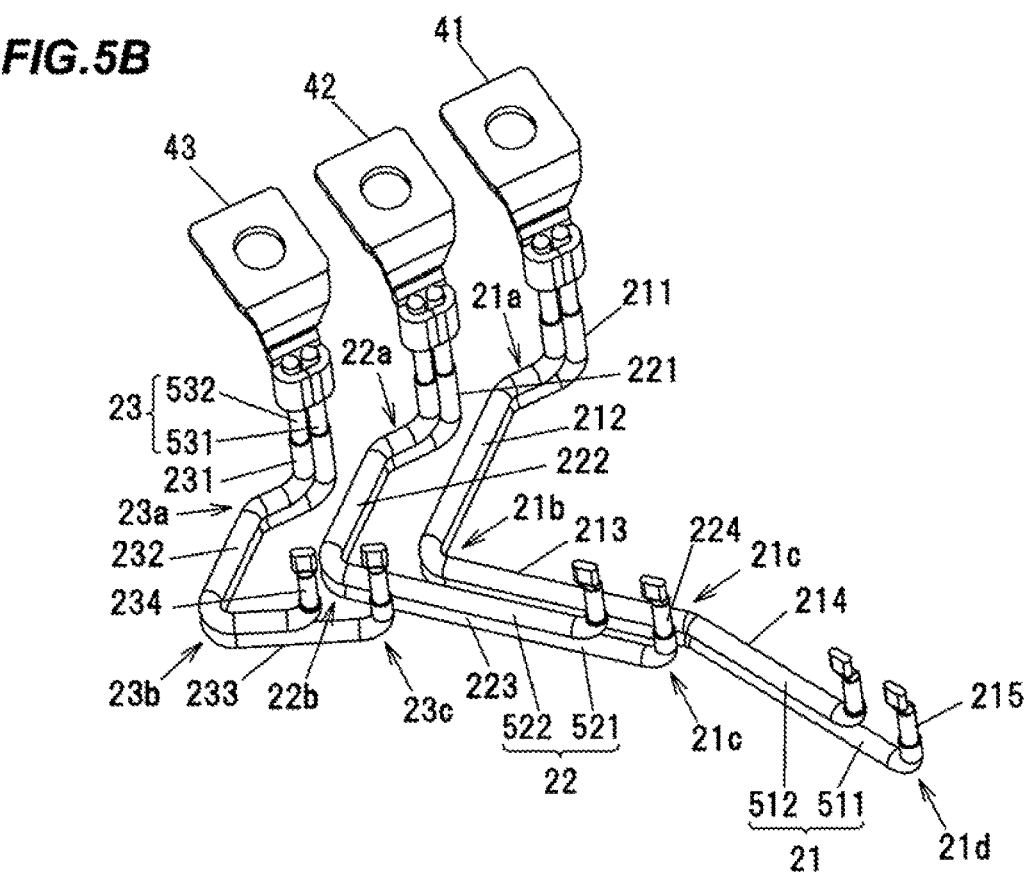
FIG. 5B is a perspective view showing the entirety of first to third linear conductors wherein the illustration of the first to third molded resin portions is omitted.

FIGS. 4A and 5A are perspective views showing the connection component 1. The connection component 1 is provided with first to third linear conductors 21 to 23 respectively corresponding to the U-, V- and W-phases, first to third molded resin portion 31 to 33 formed by molding, and first to third connecting terminals 41 to 43 connected to the terminal block 100. FIGS. 4B and 5B are perspective views in which illustration of the first to third molded resin portion 31 to 33 is omitted to show the entire first to third linear conductors 21 to 23. In FIGS. 4B and 5B, the connection component 1 is viewed in a different direction from FIGS. 4A and 5A.

The first linear conductor 21 is arranged such that one end is connected to the U-phase winding 121 and another end is connected to the terminal block 100. The second linear conductor 22 is arranged such that one end is connected to the V-phase winding 122 and another end is connected to the terminal block 100. The third linear conductor 23 is arranged such that one end is connected to the W-phase winding 123 and another end is connected to the terminal block 100. Although the respective other ends of the first to third linear conductors 21 to 23 are connected to the terminal block 100 via the first to third connecting terminals 41 to 43 in the present embodiment, it is not limited thereto. For example, the first to third linear conductors 21 to 23 may be directly connected to the terminal block 100 by bending end portions on the terminal block 100 side into an annular or arc shape.

The terminal block 100 has plural (three) washers (not shown), and the first to third connecting terminals 41 to 43 are respectively fixed to the washers by bolts 40 (see FIGS. 1 and 2A). The terminal block 100 is fixed to a vehicle body by a fixing member (not shown) and the washers are electrically connected to output terminals of the inverter through a wire harness.

In the present embodiment, each of the first to third linear conductors 21 to 23 is formed by adjacently arranging plural wiring materials in parallel to each other. In more detail, the U-phase first linear conductor 21 is formed by arranging insulated wires 511 and 512 as a pair of wiring materials in parallel, the V-phase second linear conductor 22 is formed by arranging insulated wires 521 and 522 as a pair of wiring materials in parallel, and the W-phase third linear conductor 23 is formed by arranging insulated wires 531 and 532 as a pair of wiring materials in parallel. Each of the insulated wires 511, 512, 521, 522, 531 and 532 is formed by, e.g., providing an insulation to cover a circular cross-sectional shaped core formed of a highly conductive metal such as copper, and the core is exposed at both ends by removing the insulation.

The pair of insulated wires 511 and 512 constituting the U-phase first linear conductor 21 are arranged such that the insulated wire 511 is connected to the one end 121a of the U-phase winding 121 and the insulated wire 512 is connected to the other end 121b of the U-phase winding 121. The pair of insulated wires 521 and 522 constituting the V-phase second linear conductor 22 are arranged such that the insulated wire 521 is connected to the one end 122a of the V-phase winding 122 and the insulated wire 522 is connected to the other end 122b of the V-phase winding 122. The pair of insulated wires 531 and 532 constituting the W-phase third linear conductor 23 are arranged such that the insulated wire 531 is connected to the one end 123a of the W-phase winding 123 and the insulated wire 532 is connected to the other end 123b of the W-phase winding 123.

The insulated wires 511, 512, 521, 522, 531 and 532 are connected to the windings 121 to 123 by, e.g., welding. The cores of the insulated wires 511, 512, 521, 522, 531 and 532 are flattened, at one end to be connected to the windings 121 to 123, from a circular cross-sectional shape into a rectangular cross-sectional shape to facilitate connection to the windings 121 to 123. Other ends of the cores of the insulated wires 511, 512, 521, 522, 531 and 532 are respectively crimped to the first to third connecting terminals 41 to 43.

A line length between the one end connected to the winding 121-123 and the other end connected to the terminal block 100 is different for each of the first to third linear conductors 21 to 23, such that the line length of the second linear conductor 22 is longer than that of the third linear conductor 23 and the line length of the first linear conductor 21 is still longer than that of the second linear conductor 22. In the present embodiment, the insulated wire 522, which is the shorter of the insulated wires 521 and 522 of the second linear conductor 22, is longer than the insulated wire 531 which is the longer of the insulated wires 531 and 532 of the third linear conductor 23, and the insulated wire 512, which is the shorter of the insulated wires 511 and 512 of the first linear conductor 21, is longer than the insulated wire 521 which is the longer of the insulated wires 521 and 522 of the second linear conductor 22.

The first to third linear conductors 21 to 23 are bent at plural points and have a straight shape between the end portions and the bent portions. The first linear conductor 21 has first to fourth bent portions 21a to 21d and first to fifth straight portions 211 to 215. The second linear conductor 22 has first to third bent portions 22a to 22c and first to fourth straight portions 221 to 224. The third linear conductor 23 has first to third bent portions 23a to 23c and first to fourth straight portions 231 to 234. Of those, the first bent portions 21a, 22a and 23a correspond to "bend portions" of the invention, at which the insulated wires 511, 512, 521, 522, 531 and 532 are bent between the first straight portions 211, 221 and 231 and the second straight portions 212, 222 and 232.

The first to third connecting terminals 41 to 43 are respectively connected to the ends of the first straight portions 211, 221 and 231 of the first to third linear conductors 21 to 23. The U-phase winding 121 is connected to an end of the fifth straight portion 215 of the first linear conductor 21, and the V- and W-phase windings 122 and 123 are respectively connected to the fourth straight portions 224 and 234 of the second and third linear conductors 22 and 23.

Although the first to third linear conductors 21 to 23 in the present embodiment are configured that the first bent portions 21a, 22a and 23a have short straight portions between bent portions which are bent at both ends in different directions, the short straight portions may not be present. In other words, the first bent portions 21a, 22a and 23a may be formed by bending the first to third linear conductors 21 to 23 at one point between the first straight portions 211, 221 and 231 and the second straight portions 212, 222 and 232.

The first molded resin portion 31 covers portions of the first to third linear conductors 21 to 23 and connects the first to third linear conductors 21 to 23 to each other. In detail, the first to third linear conductors 21 to 23 are covered such that the first bent portions 21a, 22a and 23a, portions of the first straight portions 211, 221 and 231 on the first bent portions 21a, 22a and 23a side and portions of the second straight portions 212, 222 and 232 on the first bent portions 21a, 22a and 23a side are located inside the first molded resin portion 31.

The first to third linear conductors 21 to 23 are configured that the first straight portions 211, 221 and 231 and the second straight portions 212, 222 and 232 extend out of the first molded resin portion 31 in different directions from each other. The first straight portions 211, 221 and 231 extend in a first direction indicated by an arrow $A_1$ in FIGS. 4A and 5A, and the second straight portions 212, 222 and 232 extend in a second direction indicated by an arrow $A_2$ in FIGS. 4A and 5A. In the present embodiment, the first direction is parallel to a rotational axis O of the rotor 13 of the three-phase motor 10. The second direction is perpendicular to the direction parallel to the rotational axis O and is inclined with respect to a radial direction which is orthogonal to the rotational axis O. Tip portions of the first straight portions 211, 221 and 231 of the first to third linear conductors 21 to 23 are respectively electrically connected to the terminal block 100.

The first molded resin portion 31 has a bar-shaped coupling portion 310 for coupling the first to third linear conductors 21 to 23, and plural (three) protruding portions 311, 312 and 313 protruding from the coupling portion 310 respectively along the second straight portions 212, 222 and 232 of the first to third linear conductors 21 to 23. The first to third linear conductors 21 to 23 are arranged so that portions of the first straight portions 211, 221 and 231, portions of the second straight portions 212, 222 and 232 and the first bent portions 21a, 22a and 23a are covered with the coupling portion 310 of the first molded resin portion 31.

The third straight portions 213, 223 and 233 of the first to third linear conductors 21 to 23 extend in a direction which is perpendicular to the direction parallel to the rotational axis O and is also substantially at a right angle with respect to the second straight portions 212, 222 and 232. The third straight portion 213 of the first linear conductor 21, which is the longest of the third straight portions 213, 223 and 233, and the third straight portion 223 of the second linear conductor 22 adjacent to the first linear conductor 21 are coupled to each other by the second molded resin portion 32. Thus, the first linear conductor 21 and the second linear conductor 22 can maintain the shape and position relative to each other.

The fourth straight portion 214 of the first linear conductor 21 is perpendicular to the direction parallel to the rotational axis O and is inclined at an obtuse angle with respect to the third straight portion 213 so as to extend along the circumferential direction of the stator 12. The fifth straight portion 215 of the first linear conductor 21 extends in parallel to the rotational axis O from an opposite end of the fourth straight portion 214 to the third straight portion 213. A tip portion of the fifth straight portion 215 is connected to the U-phase winding 121.

The fourth straight portion 224 of the second linear conductor 22 extends in parallel to the rotational axis O from an opposite end of the third straight portion 223 to the second straight portion 222. A tip portion of the fourth straight portion 224 of the second linear conductor 22 is connected to the V-phase winding 122. Likewise, the fourth straight portion 234 of the third linear conductor 23 extends in parallel to the rotational axis O from an opposite end of the third straight portion 233 to the second straight portion 232. A tip portion of the fourth straight portion 234 of the third linear conductor 23 is connected to the W-phase winding 123.

The third molded resin portions 33 are provided to respectively correspond to the first to third linear conductors 21 to 23. In other words, the connection component 1 in the present embodiment is provided with three third molded resin portions 33. When it is necessary to distinguish the three third molded resin portions 33 for the purpose of explanation, the third molded resin portion 33 provided on the first linear conductor 21 is referred to as a U-phase third molded resin portion 33U, the third molded resin portion 33 provided on the second linear conductor 22 is referred to as a V-phase third molded resin portion 33V, and the third molded resin portion 33 provided on the third linear conductor 23 is referred to as a W-phase third molded resin portion 33W.

The U-phase third molded resin portion 33U is provided in the vicinity of an end of the first linear conductor 21 on the terminal block 100 side to cover the fourth bent portion 21d, a portion of the fourth straight portion 214 on the fourth bent portion 21d side and a portion of the fifth straight portion 215 on the fourth bent portion 21d side. The V-phase third molded resin portion 33V is provided in the vicinity of an end of the second linear conductor 22 on the terminal block 100 side to cover the third bent portion 22c, a portion of the third straight portion 223 on the third bent portion 22c side and a portion of the fourth straight portion 224 on the third bent portion 22c side. The W-phase third molded resin portion 33W is provided in the vicinity of an end of the third linear conductor 23 on the terminal block 100 side to cover the third bent portion 23c, a portion of the third straight portion 233 on the third bent portion 23c side and a portion of the fourth straight portion 234 on the third bent portion 23c side.

The U-phase third molded resin portion 33U couples the pair of insulated wires 511 and 512 of the first linear conductor 21, the V-phase third molded resin portion 33V couples the pair of insulated wires 521 and 522 of the second linear conductor 22, and the W-phase third molded resin portion 33W couples the pair of insulated wires 531 and 532 of the third linear conductor 23.

The V-phase third molded resin portion 33V is molded integrally with the second molded resin portion 32. In more detail, the V-phase third molded resin portion 33V is continuously formed from the second molded resin portion 32 on the third bent portion 21c side so as to extend along the third straight portion 223 of the second linear conductor 22.

A process of forming the first to third molded resin portions 31 to 33 includes a primary molding step and a secondary molding step. In the primary molding step, plural primary molded resin portions are formed to respectively couple between the insulated wires 511 and 512 of the first linear conductor 21, between the insulated wires 521 and 522 of the second linear conductor 22 and between the insulated wires 531 and 532 of the third linear conductor 23. In the second molding step, a secondary molded resin portion is formed to couple the plural primary molded resin portions formed in the primary molding step. In detail, the first and second molded resin portions 31 and 32 are formed through the primary and second molding steps, and the third molded resin portions 33 are formed only through the primary molding step. Next, a method of manufacturing the connection component 1, including the primary and second molding steps, will be described in reference to FIGS. 6 to 9.

Figure 6:
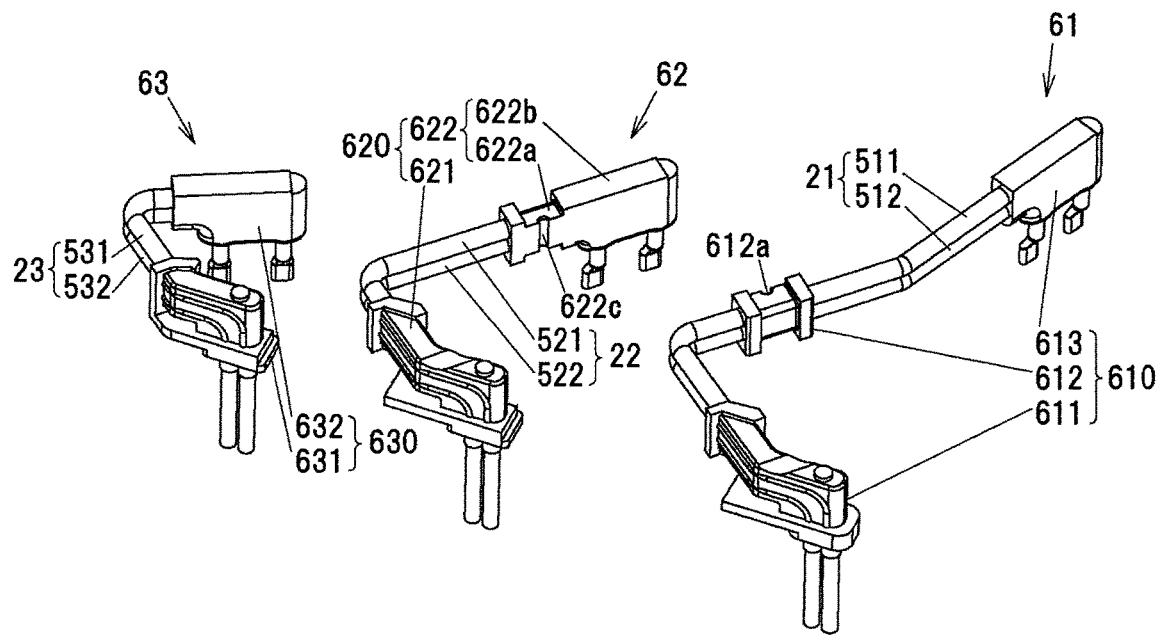
FIG. 6 is a perspective view showing first to third assemblies after primary molding.
Figure 7:
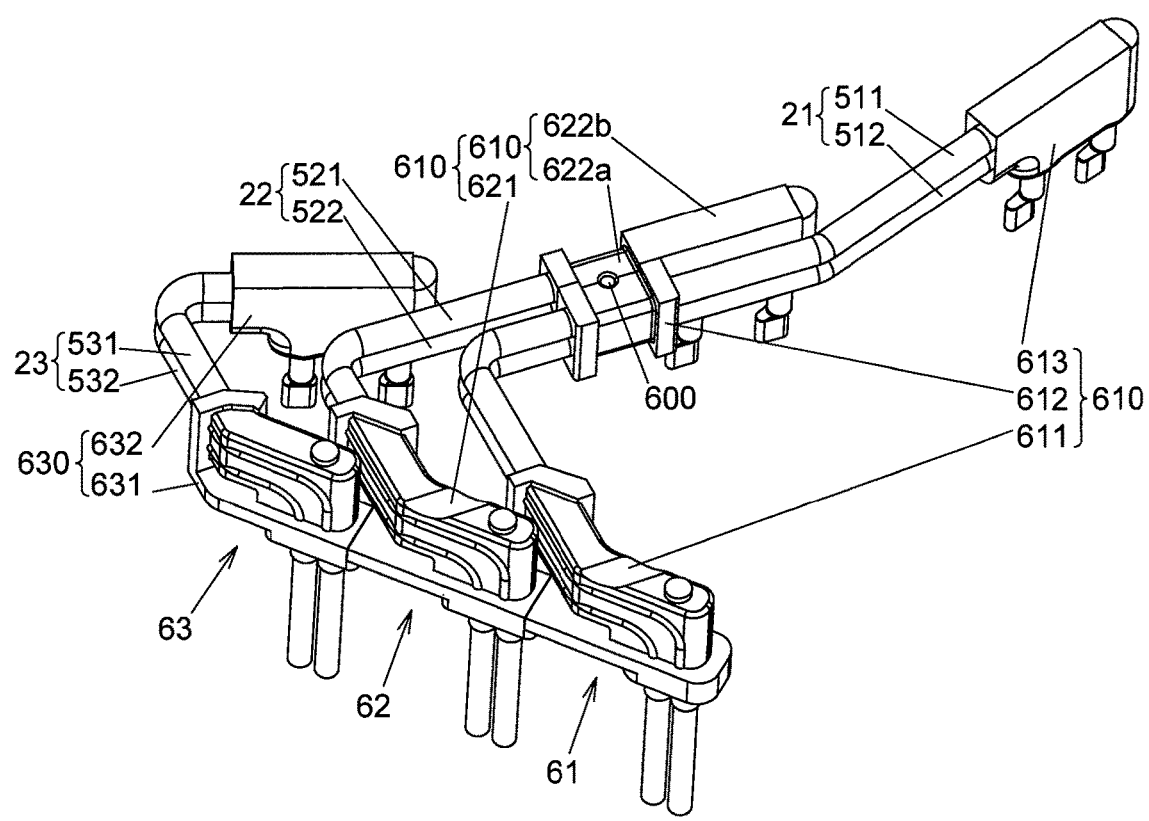
FIG. 7 is a perspective view showing an assembled state of the first to third assemblies.
Figure 8A:
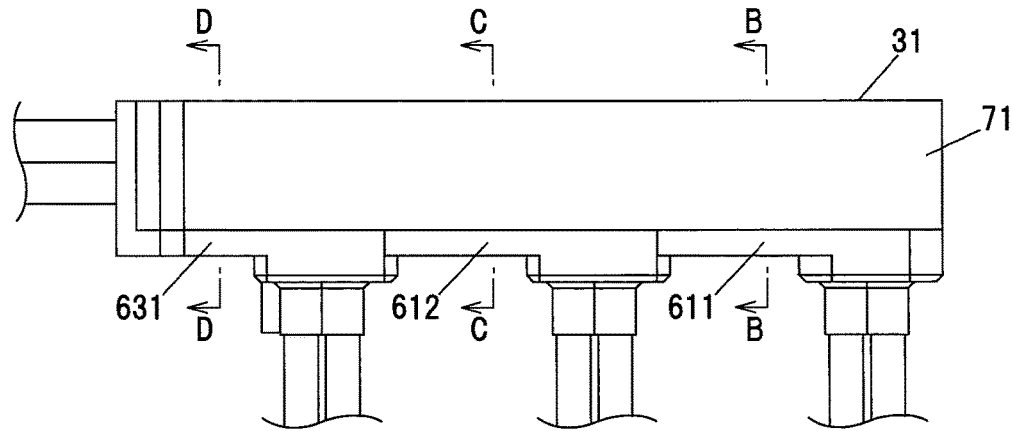
Figure 8B:
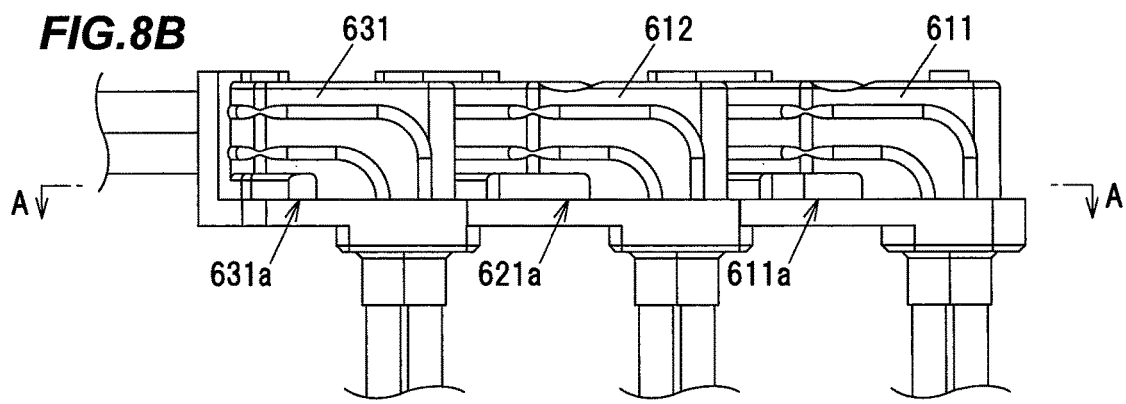
Figure 8C:
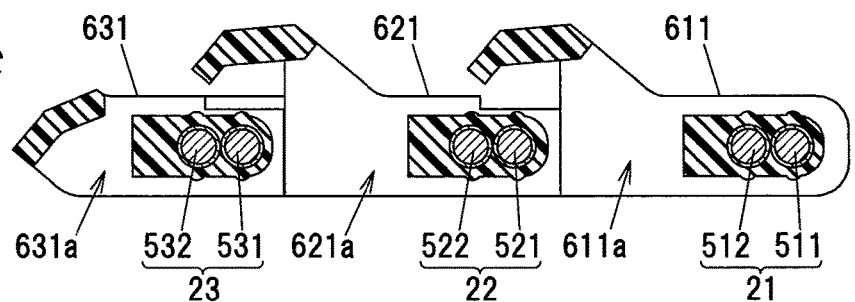
Figure 8D:
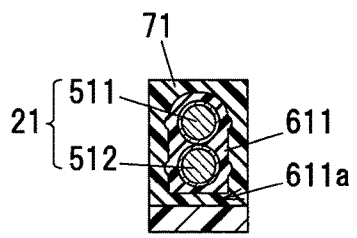
Figure 8E:
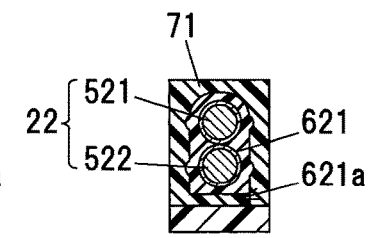
Figure 8F:
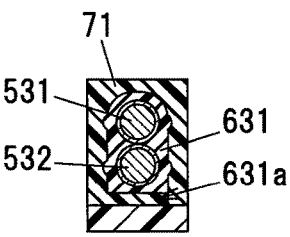
Figure 9:
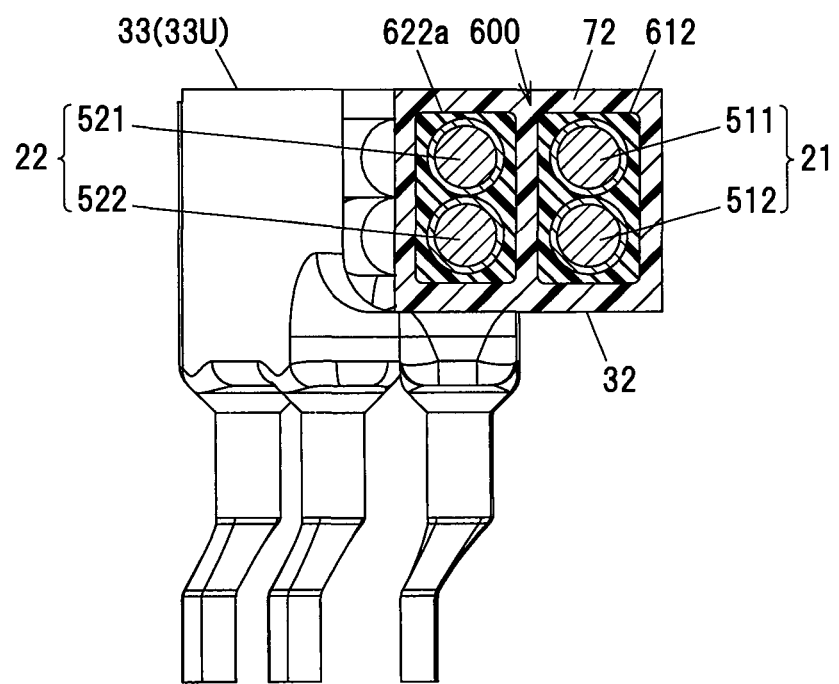
FIG. 9 is a cross sectional view taken along a line E-E in FIG. 4A.

FIG. 6 is a perspective view showing first to third assemblies 61 to 63 after primary molding. FIG. 7 is a perspective view showing an assembled state of the first to third assemblies 61 to 63. FIGS. 8A to 8F show the first molded resin portion when viewed from the outside of the three-phase motor, wherein FIG. 8A is a general view, FIG. 8B is a state diagram before the secondary molding step, FIG. 8C is a cross sectional view taken along the line A-A in FIG. 8B, FIG. 8D is a cross sectional view taken along the line B-B in FIG. 8A, FIG. 8E is a cross sectional view taken along the line C-C in FIG. 8A and FIG. 8F is a cross sectional view taken along the line D-D in FIG. 8A. FIG. 9 is a cross sectional view taken along the line E-E in FIG. 4A.

The first assembly 61 has the first linear conductor 21 and a primary molded resin portion 610 formed by primary molding. The primary molded resin portion 610 is composed of a U-phase first molded resin portion 611, a U-phase second molded resin portion 612 and a U-phase third molded resin portion 613. The insulated wires 511 and 512 of the first linear conductor 21 are coupled by the U-phase first molded resin portion 611, the U-phase second molded resin portion 612 and the U-phase third molded resin portion 613.

The second assembly 62 has the second linear conductor 22 and a primary molded resin portion 620 formed by primary molding. The primary molded resin portion 620 is composed of a V-phase first molded resin portion 621 and a V-phase second molded resin portion 622. The insulated wires 521 and 522 of the second linear conductor 22 are coupled by the V-phase first molded resin portion 621 and the V-phase second molded resin portion 622.

The third assembly 63 has the third linear conductor 23 and a primary molded resin portion 630 formed by primary molding. The primary molded resin portion 630 is composed of a W-phase first molded resin portion 631 and a W-phase second molded resin portion 632. The insulated wires 531 and 532 of the third linear conductor 23 are coupled by the W-phase first molded resin portion 631 and the W-phase second molded resin portion 632.

In the secondary molding step, the U-phase first molded resin portion 611, the V-phase first molded resin portion 621 and the W-phase first molded resin portion 631 are placed in one cavity of a die and are coupled to each other by a secondary molding resin filled in the cavity. In other words, the U-phase first molded resin portion 611, the V-phase first molded resin portion 621 and the W-phase first molded resin portion 631 are coupled and integrated by a secondary molded resin portion 71 (see FIG. 8A). That is, the first molded resin portion 31 is composed of the U-phase first molded resin portion 611, the V-phase first molded resin portion 621, the W-phase first molded resin portion 631 and the secondary molded resin portion 71. In FIGS. 4A and 5A, the boundaries between the molded resin portions 611, 621, 631 and 71 are indicated by solid lines.

As shown in FIGS. 8B to 8F, the U-phase first molded resin portion 611, the V-phase first molded resin portion 621 and the W-phase first molded resin portion 631 respectively have through-holes 611a, 621a and 631a formed in the primary molding step. The through-holes 611a, 621a and 631a are formed when the mold used in primary molding is demolded. In the secondary molding step, a portion of a molding resin used to form the secondary molded resin portion 71 is filled in the through-holes 611a, 621a and 631a.

As shown in FIG. 8D, a portion of the U-phase first molded resin portion 611 including the through-hole 611a is surrounded by the secondary molded resin portion 71. Respective portions of the V-phase first molded resin portion 621 and the W-phase first molded resin portion 631 including the through-holes 621a and 631a are also surrounded by the secondary molded resin portion 71, as shown in FIGS. 8E and 8F. The U-phase first molded resin portion 611, the V-phase first molded resin portion 621 and the W-phase first molded resin portion 631 are thus prevented from separating from the secondary molded resin portion 71 even when the connection component 1 is vibrated.

As shown in FIG. 9, the second molded resin portion 32 is composed of the U-phase second molded resin portion 612, a portion of the V-phase second molded resin portion 622 and a secondary molded resin portion 72 formed in the secondary molding step. In the following description, a portion of the V-phase second molded resin portion 622 to be included in the second molded resin portion 32 is referred to as a first region 622a of the V-phase second molded resin portion 622, and the remaining portion of the V-phase second molded resin portion 622 is referred to as a second region 622b.

In the first region 622a of the V-phase second molded resin portion 622, a groove 622c having a semicircular cross section is formed on a surface facing the U-phase second molded resin portion 612, as shown in FIG. 6. Also on the U-phase second molded resin portion 612, a groove 612a having a semicircular cross section is formed on a surface facing the first region 622a of the V-phase second molded resin portion 622. In the secondary molding step, the U-phase second molded resin portion 612 and the V-phase second molded resin portion 622 are placed in a cavity of the mold in a state that a through-hole 600 (see FIG. 7) having a circular cross section is formed by a combination of the grooves 612a and 622c. The through-hole 600 is to be filled with a molding resin used to form the secondary molded resin portion 72. A portion of the U-phase second molded resin portion 612 including the groove 612a and a portion of the first region 622a of the V-phase second molded resin portion 622 including the groove 622c are surrounded by the secondary molded resin portion 72. The U-phase second molded resin portion 612 and the V-phase second molded resin portion 622 are thus prevented from separating from each other even when the connection component 1 is vibrated.

The U-phase third molded resin portion 613, the second region 622b of the V-phase second molded resin portion 622 and the W-phase second molded resin portion 632 respectively become the U-phase third molded resin portion 33U, the V-phase third molded resin portion 33V and the W-phase third molded resin portion 33W.

Functions and Effects of the Embodiment

The following functions and effects are obtained in the present embodiment.

(1) In the configuration in which portions of the first straight portions 211, 221 and 231, the first bent portions 21a, 22a and 23a and portions of the second straight portions 212, 222 and 232 of the first to third linear conductors 21 to 23 are covered with one first molded resin portion 31, the first to third linear conductors 21 to 23 are prevented from moving with respect to the first molded resin portion 31. In other words, the first to third linear conductors 21 to 23 are prevented by the second straight portions 212, 222 and 232 inside the first molded resin portion 31 from moving with respect to the first molded resin portion 31 in an extending direction of the first straight portions 211, 221 and 231 (the first direction indicated by the arrow $A_1$), and are prevented by the first straight portions 211, 221 and 231 inside the first molded resin portion 31 from moving with respect to the first molded resin portion 31 in an extending direction of the second straight portions 212, 222 and 232 (the second direction indicated by the arrow $A_2$). Therefore, even when the connection component 1 is vibrated, wear of the first molded resin portion 31 due to friction with the first to third linear conductors 21 to 23 and resulting formation of a gap between the first to third linear conductors 21 to 23 and the first molded resin portion 31 are prevented. As a result, noise generation is reduced and it is also possible to provide an enough space between the first to third linear conductors 21 to 23 and between the first to third linear conductors 21 to 23 and surrounding conductive members by maintaining the shape as a whole, allowing an appropriate insulation distance to be maintained.

(2) Since the first straight portions 211, 221 and 231 of the first to third linear conductors 21 to 23 extend out of the first molded resin portion 31 in a direction parallel to the rotational axis O of the rotor 13, it is possible to reduce the size of the connection component 1 in the radial direction of the three-phase motor 10 even when the line length between the one end connected to the phase winding 121-123 and the other end connected to the terminal block 100 is long.

(3) Since the first to third linear conductors 21 to 23 are coupled by the first molded resin portion 31, the first to third linear conductors 21 to 23 can be attached together to the three-phase motor 10 and also to the terminal block 100.

(4) Since the first molded resin portion 31 has the plural protruding portions 311, 312 and 313 protruding along the second straight portions 212, 222 and 232 of the first to third linear conductors 21 to 23 from the bar-shaped coupling portion 310 which couples the first to third linear conductors 21 to 23, the first molded resin portion 31 can be fixed onto the first to third linear conductors 21 to 23 more securely and it is thus possible to further prevent the first to third linear conductors 21 to 23 from moving with respect to the first molded resin portion 31.

(5) Since the third straight portion 213 of the first linear conductor 21, which is the longest of the third straight portions 213, 223 and 233 of the first to third linear conductors 21 to 23, and the third straight portion 223 of the adjacent second linear conductor 22 are coupled by the second molded resin portion 32, amplitude of vibration when the third straight portion 213 of the first linear conductor 21 is vibrated is reduced, and the noise suppression effect and an effect of maintaining an appropriate insulation distance are exerted more remarkably.

(6) The first linear conductor 21 is composed of the pair of insulated wires 511 and 512 and is thus easily connected to the one and other ends 121a and 121b of the U-phase winding 121. Also, vibration of the first linear conductor 21 in an alignment direction of the insulated wires 511 and 512 is suppressed. The same applies to the second and third linear conductors 22 and 23.

(7) The third molded resin portions 33 are provided in the vicinity of the respective ends of the first to third linear conductors 21 to 23 on the windings 121 to 123 side and respectively couple between the insulated wires 511 and 512 of the first linear conductor 21, between the insulated wires 521 and 522 of the second linear conductor 22 and between the insulated wires 531 and 532 of the third linear conductor 23. Therefore, distances between connection portions, at which the fifth straight portion 215 of the first linear conductor 21 and the fourth straight portions 224 and 234 of the second and third linear conductors 22 and 23 are connected to the ends 121a and 121b of the U-phase winding 121, the ends 122a and 122b of the V-phase winding 122 and the ends 123a and 123b of the W-phase winding 123, are stable and this facilitates connection to the windings 121 to 123.

(8) The second molded resin portion 32 is formed integrally with the V-phase third molded resin portion 33V. This allows the structure of the mold for forming the second molded resin portion 32 to be simplified and it is also possible to suppress vibration of the second molded resin portion 32.

(9) Since the first molded resin portion 31 is composed of the U-phase first molded resin portion 611, the V-phase first molded resin portion 621 and the W-phase first molded resin portion 623 formed in the primary molding and the secondary molded resin portion 71 formed in the secondary molding step, the first to third linear conductors 21 to 23 can be arranged close to each other. That is, when the first molded resin portion 31 is formed by performing a resin molding step only once, it is necessary to move slide molds in a direction orthogonal to the alignment direction of the pair of insulated wires 511 and 512 of the first linear conductor 21, a direction orthogonal to the alignment direction of the pair of insulated wires 521 and 522 of the second linear conductor 22 and in a direction orthogonal to the alignment direction of the pair of insulated wires 531 and 532 of the third linear conductor 23, and it is also necessary to relatively move upper and lower molds in a direction orthogonal to the alignment direction of the first to third linear conductors 21 to 23, which makes the structure of the mold complicated and does not allow the first to third linear conductors 21 to 23 to be arranged close to each other. On the other hand, in the present embodiment, since the U-phase first molded resin portion 611, the V-phase first molded resin portion 621 and the W-phase first molded resin portion 631 are formed in the primary molding step and are coupled by the secondary molded resin portion 71 in the secondary molding step, it is possible to arrange the first to third linear conductors 21 to 23 close to each other. It is thus possible to reduce the size of the connection component 1.

(10) Since the through-holes 611a, 621a and 631a are respectively formed on the U-phase first molded resin portion 611, the V-phase first molded resin portion 621 and the W-phase first molded resin portion 631 and are filled with a portion of the molding resin of the secondary molded resin portion 71, it is possible to prevent the U-phase first molded resin portion 611, the V-phase first molded resin portion 621 and the W-phase first molded resin portion 631 from separating from the secondary molded resin portion 71.

SUMMARY OF THE EMBODIMENTS

Technical ideas understood from the above described embodiment will be described below citing the reference numerals, etc., used for the embodiment. However, each reference numeral described below is not intended to limit the constituent elements in the claims to the members, etc., specifically described in the embodiment.

[1] A rotating electrical machine connection component (connection component (1)), which is used to supply multiphase currents having different phases to windings (121 to 123) of a rotating electrical machine (three-phase motor (10)) that comprises a rotor (13) and a stator (12) comprising an annular core (stator core 120) surrounding the rotor (13) and the windings (121 to 123) wound thereon, the rotating electrical machine connection component (connection component (1)) comprising:

a plurality of linear conductors (21 to 23) that respectively correspond to the different phases and are provided such that one end is connected to the winding (121 to 123) and the other end is connected to a terminal block (100); and a first molded resin portion (31) that covers portions of the plurality of linear conductors (21 to 23) and connects the plurality of linear conductors (21 to 23) to each other, wherein each of the plurality of linear conductors (21 to 23) comprises a first straight portion (211, 221, 231) extending out of the first molded resin portion (31) in a direction parallel to a rotational axis (0) of the rotor (13) and connected to the terminal block (100), a second straight portion (212, 222, 232) extending out of the first molded resin portion (31) in a different direction from the first straight portion (211, 221, 231) and a bent portion (21a, 22a, 23a) bent between the first straight portion (211, 221, 231) and the second straight portion (212, 222, 232), and of each of the plurality of linear conductors (21 to 23), a part of the first straight portions (211, 221, 231), the bend portions (21a, 22a, 23a) and a part of the second straight portions (212, 222, 232) are covered by the first molded resin portion (31).

[2] The rotating electrical machine connection component (1) defined by [1], wherein the first molded resin portion (31) comprises a coupling portion (310) for coupling the plurality of linear conductors (21 to 23), and a plurality of protruding portions (311, 312, 313) protruding from the coupling portion (310) respectively along the second straight portions (212, 222, 232) of the plurality of linear conductors (21 to 23).

[3] The rotating electrical machine connection component (1) defined by [1] or [2], wherein a line length between the one end to the other end is different for each of the plurality of linear conductors (21 to 23), and a second molded resin portion (32) is further provided to couple the longest (linear conductor (21)) of the plurality of linear conductors (21 to 23) to at least one (linear conductor (22)) of the other linear conductors.

[4] The rotating electrical machine connection component (1) defined by any one of [1] to [3], wherein each of the plurality of linear conductors (21 to 23) comprises a plurality of wiring materials (511, 512, 521, 522, 531, 532) arranged in parallel.

[5] The rotating electrical machine connection component (1) defined by [4], further comprising: a plurality of third molded resin portions (33) provided in the vicinity of the respective other ends of the plurality of linear conductors (21 to 23), wherein each plurality of wiring materials (511, 512, 521, 522, 531, 532) are coupled to each other by the third molded resin portion (33).

[6] The rotating electrical machine connection component (1) defined by [3], further comprising: a plurality of third molded resin portions (33) provided in the vicinity of the respective other ends of the plurality of linear conductors (21 to 23), wherein each of the plurality of linear conductors (21 to 23) comprises a plurality of wiring materials (511, 512, 521, 522, 531, 532) arranged in parallel, each plurality of wiring materials (511, 512, 521, 522, 531, 532) are coupled to each other by the third molded resin portion (33), and the second molded resin portion (32) is formed integrally with one (third molded resin portion 33V) of the plurality of third molded resin portions (33).

[7] The rotating electrical machine connection component (1) defined by any one of [4] to [6], wherein the first molded resin portion (31) comprises a plurality of primary molded resin portions (U-phase first molded resin portion 611, V-phase first molded resin portion 621, W-phase first molded resin portion 631) coupling the respective plurality of wiring materials (511, 512, 521, 522, 531, 532) of the plurality of linear conductors (21 to 23), and a secondary molded resin portion (71) coupling the plurality of primary molded resin portions (611, 621, 631) to each other.

[8] The rotating electrical machine connection component (1) defined by [7], wherein a through-hole (611a, 621a, 631a) is formed on each of the plurality of primary molded resin portions (611, 621, 631), and a portion of a molding resin of the secondary molded resin portion (71) is filled in the through-holes (611a, 621a, 631a).

[9] A method of manufacturing a rotating electrical machine connection component (1), which is used to supply multi-phase currents having different phases to windings (121 to 123) of a rotating electrical machine (10) that comprises a rotor (13) and a stator (12) comprising an annular core (120) surrounding the rotor (12) and the windings (121 to 123) wound thereon, the rotating electrical machine connection component (1) comprising a plurality of linear conductors (21 to 23) that respectively correspond to the different phases, and a molded resin portion (31) that covers portions of the plurality of linear conductors (21 to 23) and connects the plurality of linear conductors (21 to 23) to each other, wherein the plurality of linear conductors (21 to 23) are provided such that one end is connected to the winding (121 to 123) and the other end is connected to a terminal block (100), each of the plurality of linear conductors (21 to 23) comprises a first straight portion (211, 221, 231) extending out of the molded resin portion (31) in a direction parallel to a rotational axis (O) of the rotor (13) and connected to the terminal block (100), a second straight portion (212, 222, 232) extending out of the molded resin portion (31) in a different direction from the first straight portion (211, 221, 231) and a bent portion (21a, 22a, 23a) bent between the first straight portion (211, 221, 231) and the second straight portion (212, 222, 232), and each of the plurality of linear conductors (21 to 23) comprises a plurality of wiring materials (511, 512, 521, 522, 531, 532) arranged in parallel, the method comprising molding the molded resin portion (31), wherein the molding comprises primarily molding a plurality of primary molded resin portions (611, 621, 631) coupling the respective plurality of wiring materials (511, 512, 521, 522, 531, 532) of the plurality of linear conductors (21 to 23), and secondarily molding a secondary molded resin portion (71) coupling the plurality of primary molded resin portions (611, 621, 631) to each other.

[10] The method defined by [9], wherein a through-hole (611a, 621a, 631a) is formed on each of the plurality of primary molded resin portions (611, 621, 631) during the primarily molding, and the secondary molded resin portion (71) is molded while filling the through-holes (611a, 621a, 631a) with a molding resin during the secondarily molding.

Although the embodiment of the invention has been described, the invention according to claims is not to be limited to the embodiment. Further, please note that all combinations of the features described in the embodiment are not necessary to solve the problem of the invention.

What is claimed is:

1. A rotating electrical machine connection component, which is used to supply multi-phase currents having different phases to windings of a rotating electrical machine that comprises a rotor and a stator comprising an annular core surrounding the rotor and having the windings wound thereon, the rotating electrical machine connection component comprising:
    a plurality of linear conductors that respectively correspond to the different phases and are provided such that one end is connected to the winding and the other end is connected to a terminal block; and
    a first molded resin portion that covers portions of the plurality of linear conductors and connects the plurality of linear conductors to each other,
    wherein each of the plurality of linear conductors comprises a first straight portion extending out of the first molded resin portion in a direction parallel to a rotational axis of the rotor and connected to the terminal block, a second straight portion extending out of the first molded resin portion in a different direction from the first straight portion and a bent portion bent between the first and second straight portions, and of each of the plurality of linear conductors, a part of the first straight portion, the bend portion and a part of the second straight portion are covered by the first molded resin portion, and
    wherein the first molded resin portion comprises a coupling portion for coupling the plurality of linear conductors, and a plurality of protruding portions protruding from the coupling portion respectively along the second straight portions of the plurality of linear conductors.

2. A rotating electrical machine connection component, which is used to supply multi-phase currents having different phases to windings of a rotating electrical machine that comprises a rotor and a stator comprising an annular core surrounding the rotor and having the windings wound thereon, the rotating electrical machine connection component comprising:
    a plurality of linear conductors that respectively correspond to the different phases and are provided such that one end is connected to the winding and the other end is connected to a terminal block; and a first molded resin portion that covers portions of the plurality of linear conductors and connects the plurality of linear conductors to each other, wherein each of the plurality of linear conductors comprises a first straight portion extending out of the first molded resin portion in a direction parallel to a rotational axis of the rotor and connected to the terminal block, a second straight portion extending out of the first molded resin portion in a different direction from the first straight portion and a bent portion bent between the first and second straight portions, and of each of the plurality of linear conductors, a part of the first straight portion, the bend portion and a part of the second straight portion are covered by the first molded resin portion, and wherein a line length between the one end to the other end is different for each of the plurality of linear conductors, and a second molded resin portion is further provided to couple the longest of the plurality of linear conductors to at least one of the other linear conductors.

3. The rotating electrical machine connection component according to claim 1, wherein each of the plurality of linear conductors comprises a plurality of wiring materials arranged in parallel.

4. A rotating electrical machine connection component, which is used to supply multi-phase currents having different phases to windings of a rotating electrical machine that comprises a rotor and a stator comprising an annular core surrounding the rotor and having the windings wound thereon, the rotating electrical machine connection component comprising:

a plurality of linear conductors that respectively correspond to the different phases and are provided such that one end is connected to the winding and the other end is connected to a terminal block; and a first molded resin portion that covers portions of the plurality of linear conductors and connects the plurality of linear conductors to each other, wherein each of the plurality of linear conductors comprises a first straight portion extending out of the first molded resin portion in a direction parallel to a rotational axis of the rotor and connected to the terminal block, a second straight portion extending out of the first molded resin portion in a different direction from the first straight portion and a bent portion bent between the first and second straight portions, and of each of the plurality of linear conductors, a part of the first straight portion, the bend portion and a part of the second straight portion are covered by the first molded resin portion, wherein each of the plurality of linear conductors comprises a plurality of wiring materials arranged in parallel, and further comprising:

a plurality of third molded resin portions provided in the vicinity of the respective other ends of the plurality of linear conductors, wherein each plurality of wiring materials are coupled to each other by the third molded resin portion.

5. The rotating electrical machine connection component according to claim 2, further comprising:

a plurality of third molded resin portions provided in the vicinity of the respective other ends of the plurality of linear conductors, wherein each of the plurality of linear conductors comprises a plurality of wiring materials arranged in parallel, each plurality of wiring materials are coupled to each other by the third molded resin portion, and the second molded resin portion is formed integrally with one of the plurality of third molded resin portions.

6. A rotating electrical machine connection component, which is used to supply multi-phase currents having different phases to windings of a rotating electrical machine that comprises a rotor and a stator comprising an annular core surrounding the rotor and having the windings wound thereon, the rotating electrical machine connection component comprising:

a plurality of linear conductors that respectively correspond to the different phases and are provided such that one end is connected to the winding and the other end is connected to a terminal block; and a first molded resin portion that covers portions of the plurality of linear conductors and connects the plurality of linear conductors to each other, wherein each of the plurality of linear conductors comprises a first straight portion extending out of the first molded resin portion in a direction parallel to a rotational axis of the rotor and connected to the terminal block, a second straight portion extending out of the first molded resin portion in a different direction from the first straight portion and a bent portion bent between the first and second straight portions, and of each of the plurality of linear conductors, a part of the first straight portion, the bend portion and a part of the second straight portion are covered by the first molded resin portion, wherein each of the plurality of linear conductors comprises a plurality of wiring materials arranged in parallel, and wherein the first molded resin portion comprises a plurality of primary molded resin portions coupling the respective plurality of wiring materials of the plurality of linear conductors, and a secondary molded resin portion coupling the plurality of primary molded resin portions to each other.

7. The rotating electrical machine connection component according to claim 6, wherein a through-hole is formed on each of the plurality of primary molded resin portions, and a portion of a molding resin of the secondary molded resin portion is filled in the through-holes.

8. A method of manufacturing a rotating electrical machine connection component, which is used to supply multi-phase currents having different phases to windings of a rotating electrical machine that comprises a rotor and a stator comprising an annular core surrounding the rotor and the windings wound thereon, the rotating electrical machine connection component comprising a plurality of linear conductors that respectively correspond to the different phases, and a molded resin portion that covers portions of the plurality of linear conductors and connects the plurality of linear conductors to each other, wherein the plurality of linear conductors are provided such that one end is connected to the winding and the other end is connected to a terminal block, each of the plurality of linear conductors comprises a first straight portion extending out of the molded resin portion in a direction parallel to a rotational axis of the rotor and connected to the terminal block, a second straight portion extending out of the molded resin portion in a different direction from the first straight portion and a bent portion bent between the first and second straight portions, and each of the plurality of linear conductors comprises a plurality of wiring materials arranged in parallel, the method comprising molding the molded resin portion, wherein the molding comprises primarily molding a plurality of primary molded resin portions coupling the respective plurality of wiring materials of the plurality of linear conductors, and secondarily molding a secondary molded resin portion coupling the plurality of primary molded resin portions to each other, and wherein a through-hole is formed on each of the plurality of primary molded resin portions during the primarily molding, and the secondary molded resin portion is molded while filling the through-holes with a molding resin during the secondarily molding.

9. The rotating electrical machine connection component according to claim 1, wherein a line length between the one end to the other end is different for each of the plurality of linear conductors, and a second molded resin portion is further provided to couple the longest of the plurality of linear conductors to at least one of the other linear conductors.

10. The rotating electrical machine connection component according to claim 1, wherein each of the plurality of linear conductors comprises a plurality of wiring materials arranged in parallel.

11. The rotating electrical machine connection component according to claim 2, wherein each of the plurality of linear conductors comprises a plurality of wiring materials arranged in parallel.

12. The rotating electrical machine connection component according to claim 4, wherein the first molded resin portion comprises a plurality of primary molded resin portions coupling the respective plurality of wiring materials of the plurality of linear conductors, and a secondary molded resin portion coupling the plurality of primary molded resin portions to each other.

13. The rotating electrical machine connection component according to claim 5, wherein the first molded resin portion comprises a plurality of primary molded resin portions coupling the respective plurality of wiring materials of the plurality of linear conductors, and a secondary molded resin portion coupling the plurality of primary molded resin portions to each other.

14. The rotating electrical machine connection component according to claim 4, wherein the first molded resin portion comprises a coupling portion for coupling the plurality of linear conductors, and a plurality of protruding portions protruding from the coupling portion respectively along the second straight portions of the plurality of linear conductors.

15. The rotating electrical machine connection component according to claim 5, wherein the first molded resin portion comprises a coupling portion for coupling the plurality of linear conductors, and a plurality of protruding portions protruding from the coupling portion respectively along the second straight portions of the plurality of linear conductors.

16. The rotating electrical machine connection component according to claim 6, wherein the first molded resin portion comprises a coupling portion for coupling the plurality of linear conductors, and a plurality of protruding portions protruding from the coupling portion respectively along the second straight portions of the plurality of linear conductors.

* * * * *